(12) United States Patent
Swaminathan et al.

(10) Patent No.: US 10,384,265 B2
(45) Date of Patent: Aug. 20, 2019

(54) SELECTIVE DEPOSITING OF POWDER IN ADDITIVE MANUFACTURING

(71) Applicant: Applied Materials, Inc., Santa Clara, CA (US)

(72) Inventors: Bharath Swaminathan, San Jose, CA (US); Ajey M. Joshi, San Jose, CA (US); Nag B. Patibandla, Pleasanton, CA (US); Hou T. Ng, Campbell, CA (US); Ashavani Kumar, Sunnyvale, CA (US); Eric Ng, Mountain View, CA (US); Bernard Frey, Livermore, CA (US); Kasiraman Krishnan, Milpitas, CA (US)

(73) Assignee: Applied Materials, Inc., Santa Clara, CA (US)

( * ) Notice: Subject to any disclaimer, the term of this patent is extended or adjusted under 35 U.S.C. 154(b) by 487 days.

(21) Appl. No.: 15/186,277

(22) Filed: Jun. 17, 2016

(65) Prior Publication Data
US 2016/0368055 A1    Dec. 22, 2016

Related U.S. Application Data

(60) Provisional application No. 62/182,352, filed on Jun. 19, 2015.

(51) Int. Cl.
*B22F 3/105*    (2006.01)
*B33Y 30/00*    (2015.01)
(Continued)

(52) U.S. Cl.
CPC ............ *B22F 3/1055* (2013.01); *B23K 26/16* (2013.01); *B23K 26/342* (2015.10);
(Continued)

(58) Field of Classification Search
CPC ..... B29C 64/153; B29C 64/245; B22F 3/105; B22F 3/1017; B22F 7/02; B22F 2003/1056
See application file for complete search history.

(56) References Cited

U.S. PATENT DOCUMENTS

| | | | | |
|---|---|---|---|---|
| 4,652,318 A | * | 3/1987 | Masuda | ............... B03C 7/04 156/89.19 |
| 4,938,816 A | * | 7/1990 | Beaman | ............... B33Y 10/00 156/272.4 |

(Continued)

FOREIGN PATENT DOCUMENTS

| WO | WO 2013/092757 | 6/2013 |
|---|---|---|
| WO | WO 2015/082923 | 6/2015 |

OTHER PUBLICATIONS

International Search Report and Written Opinion in International Application No. PCT/US2016/038232, dated Aug. 24, 2016, 14 pages.

*Primary Examiner* — Joseph S Del Sole
*Assistant Examiner* — Emmanuel S Luk
(74) *Attorney, Agent, or Firm* — Fish & Richardson P.C.

(57) ABSTRACT

A method of additive manufacturing include delivering at least one layer by either depositing a uniform layer of powder on a support and then removing a portion of the layer with a roller with a surface having spatially controlled electrostatic charge, or by depositing powder onto the surface of the roller and moving the roller relative to a support such that the spatially controllable electrostatic charge on the surface of the roller causes transfer of a corresponding portion of the powder from the roller onto the support or an underlying layer.

17 Claims, 3 Drawing Sheets

(51) Int. Cl.
   *B23K 26/16*    (2006.01)
   *B22F 3/10*     (2006.01)
   *B23K 26/342*   (2014.01)
   *B33Y 10/00*    (2015.01)
   *B33Y 50/02*    (2015.01)
   *B29C 64/153*   (2017.01)
   *B23K 103/04*   (2006.01)
   *B23K 103/08*   (2006.01)
   *B23K 103/14*   (2006.01)
   *B23K 103/18*   (2006.01)
   *B29C 64/245*   (2017.01)

(52) U.S. Cl.
   CPC ............ *B29C 64/153* (2017.08); *B33Y 10/00* (2014.12); *B33Y 30/00* (2014.12); *B33Y 50/02* (2014.12); *B22F 2003/1057* (2013.01); *B23K 2103/05* (2018.08); *B23K 2103/08* (2018.08); *B23K 2103/14* (2018.08); *B23K 2103/26* (2018.08); *B29C 64/245* (2017.08); *Y02P 10/295* (2015.11)

(56) References Cited

U.S. PATENT DOCUMENTS

| | | | | |
|---|---|---|---|---|
| 5,088,047 | A * | 2/1992 | Bynum | B22F 3/1055 156/272.8 |
| 5,534,309 | A * | 7/1996 | Liu | B05B 12/02 118/688 |
| 5,593,531 | A * | 1/1997 | Penn | G03G 15/221 156/272.6 |
| 6,063,194 | A * | 5/2000 | Poliniak | A61J 3/00 118/623 |
| 6,376,148 | B1 | 4/2002 | Liu et al. | |
| 6,686,207 | B2 * | 2/2004 | Tupper | B01D 17/04 436/174 |
| 6,780,368 | B2 | 8/2004 | Liu et al. | |
| 6,923,979 | B2 * | 8/2005 | Fotland | B05B 5/007 424/439 |
| 7,481,884 | B2 * | 1/2009 | Stelter | G03G 15/09 118/247 |
| 8,107,673 | B2 | 1/2012 | Gutierrez et al. | |
| 8,124,192 | B2 | 2/2012 | Paasche et al. | |
| 8,568,124 | B2 | 10/2013 | Brunermer | |
| 8,718,522 | B2 | 5/2014 | Chillscyzn et al. | |
| 8,879,957 | B2 | 11/2014 | Hanson et al. | |
| 9,144,940 | B2 | 9/2015 | Martin | |
| 9,415,443 | B2 * | 8/2016 | Ljungblad | B22F 3/1055 |
| 9,423,756 | B2 | 8/2016 | Hanson et al. | |
| 9,557,661 | B2 | 1/2017 | Martin | |
| 9,566,647 | B1 | 2/2017 | Mook et al. | |
| 9,688,027 | B2 * | 6/2017 | Batchelder | G03G 15/224 |
| 9,720,363 | B2 * | 8/2017 | Chillscyzn | G03G 15/169 |
| 10,011,071 | B2 * | 7/2018 | Batchelder | G03G 15/1625 |
| 10,144,175 | B2 * | 12/2018 | Batchelder | B29C 64/188 |
| 10,217,599 | B2 * | 2/2019 | Sato | H01J 37/065 |
| 2010/0270708 | A1 * | 10/2010 | Jonasson | B22F 3/1055 264/401 |
| 2011/0076438 | A1 | 3/2011 | Farr et al. | |
| 2013/0075013 | A1 | 3/2013 | Chillseyzn et al. | |
| 2013/0186558 | A1 * | 7/2013 | Comb | G03G 15/169 156/277 |
| 2013/0300286 | A1 * | 11/2013 | Ljungblad | H01J 29/52 315/30 |
| 2014/0167326 | A1 * | 6/2014 | Jones | G03G 15/1645 264/427 |
| 2014/0255666 | A1 * | 9/2014 | Stucker | B29C 64/165 428/201 |
| 2015/0174822 | A1 * | 6/2015 | Huang | B22F 3/1055 264/497 |
| 2015/0270088 | A1 * | 9/2015 | Satoh | B23K 15/002 315/107 |
| 2015/0306700 | A1 * | 10/2015 | Honda | B23K 15/0086 219/121.17 |
| 2015/0367415 | A1 * | 12/2015 | Buller | B23K 26/346 419/53 |
| 2016/0011518 | A1 * | 1/2016 | Xie | G03F 7/38 430/322 |
| 2017/0136699 | A1 * | 5/2017 | Erb | B22F 3/008 |
| 2017/0197360 | A1 * | 7/2017 | Batchelder | B29C 31/047 |
| 2017/0246709 | A1 * | 8/2017 | Guerrier | B33Y 10/00 |
| 2017/0274602 | A1 * | 9/2017 | Kobayashi | B29C 67/00 |
| 2017/0299973 | A1 * | 10/2017 | Frauens | B29C 70/74 |
| 2017/0350688 | A1 * | 12/2017 | Boyd, Jr. | G01B 9/02023 |
| 2019/0022937 | A1 * | 1/2019 | Stelter | G03G 15/1625 |

* cited by examiner

SELECTIVE DEPOSITING OF POWDER IN ADDITIVE MANUFACTURING

CROSS-REFERENCE TO RELATED APPLICATIONS

This application claims priority to U.S. application Ser. No. 62/182,352, filed on Jun. 19, 2015, the entire disclosure of which is incorporated by reference.

TECHNICAL FIELD

This present invention relates to additive manufacturing, also known as 3D printing.

BACKGROUND

Additive manufacturing (AM), also known as solid freeform fabrication or 3D printing, refers to a manufacturing process where three-dimensional objects are built up from raw material (generally powders, liquids, suspensions, or molten solids) in a series of two-dimensional layers or cross-sections. Machining techniques refer to subtractive processes and produce objects that are cut out of a stock material such as a block of wood or metal.

A variety of additive processes can be used in AM. The various processes differ in the way layers are deposited to create the finished objects and in the materials that are compatible for use in each process. Some methods melt or soften material to produce layers (e.g., selective laser melting (SLM) or direct metal laser sintering (DMLS), selective laser sintering (SLS), and fused deposition modeling (FDM)). Some methods cure liquid materials using different technologies, e.g. stereolithography (SLA).

Sintering is a process of fusing small grains (e.g., powders) to create objects from smaller grains using, for example, atomic diffusion. Sintering can involve heating a powder. The powder used in sintering need not to reach a liquid phase during the sintering process, in contrast to melting. When a powdered material is heated to a temperature below the melting point in a sintering process, the atoms in the powder particles diffuse across the boundaries of the particles such that the particles fuse together to form a solid piece. As the sintering temperature does not have to reach the melting point of the material, sintering can be used for materials with high melting points such as tungsten and molybdenum.

Both sintering and melting can be used in AM. The material being used determines which process occurs. An amorphous solid, such as acrylonitrile butadiene styrene (ABS), is actually a supercooled viscous liquid, and does not actually melt; as melting involves a phase transition from a solid to a liquid state. Thus, selective laser sintering (SLS) is the relevant process for ABS, while selective laser melting (SLM) is used for crystalline and semi-crystalline materials such as nylon and metals, which have a discrete melting/freezing temperature and undergo melting during the SLM process.

SUMMARY

Systems and methods described herein can fabricate a part using an additive manufacturing (AM) process that includes transferring powder between surfaces having electrostatic charges. The electrostatic charge can be spatially controllable, such that portions of each surface can be charged while other portions remain uncharged. In one example, the AM system can manipulate the electrostatic charge on a roller surface of a roller and the electrostatic charge on a work surface of a platen on which the part is fabricated. The electrostatic charges on each of the roller surface and the work surface can be generated such that powders are transferred from the roller to the platen or from the platen to the roller. The electrostatic charges can further be spatially controllable so that certain portions of the roller and certain portions of the platen can be selected to receive the powders.

In one aspect, an additive manufacturing system, includes a dispenser to deliver a plurality of successive layers of powder over a support, the plurality of successive layers including a bottom layer deposited on the support and remaining layers each deposited on an underlying layer of fused powder, a rotatable roller, the roller movable parallel to a top surface of the support, an electron source to impart a spatially controllable electrostatic charge to a surface of the roller; an actuator configured to move the roller relative to the support such that the spatially controllable electrostatic charge on the surface of the roller causes removal of a corresponding portion of an outermost layer of powder on the support, and an energy source to fuse at least some of the outermost layer of powder.

In another aspect, an additive manufacturing system includes dispenser to deliver a plurality of successive layers of powder over a support, the plurality of successive layers including a bottom layer deposited on the support and remaining layers each deposited on an underlying layer of fused powder, and an energy source to fuse at least some of an outermost layer of powder. The dispenser includes a reservoir for a powder, a rotatable roller to receive the powder from the reservoir, the roller movable parallel to a top surface of the support, an electron source to impart a spatially controllable electrostatic charge to a surface of the roller, and an actuator configured to move the roller relative to the support such that the spatially controllable electrostatic charge on the surface of the roller causes transfer of a corresponding portion of the powder from the roller onto the support or the underlying layer of fused powder to provide the outermost layer of powder on the support.

Implementations of each system may include one or more of the following features. The roller may have a photoconductive layer, and the electron source may include a coronal discharge unit to impart a uniform charge on the roller and a light source to illuminate the roller to generate the spatially controllable electrostatic charge on the surface of the roller. The electron source may include an electron gun. The energy source may include a lamp array configured to fuse substantially all of the outermost layer of powder or a laser configured to scan the outermost layer of powder. The support may include an electrostatically chargeable chuck.

In another aspect, a method of additive manufacturing of a part includes delivering a plurality of successive layers of powder over a support. Delivering at least one layer includes depositing a uniform layer of powder on a support, imparting a spatially controllable electrostatic charge on a surface of a roller, and moving the roller relative to the support such that the spatially controllable electrostatic charge on the surface of the roller causes removal of a corresponding portion of an outermost layer of powder on the support.

In another aspect, a method of additive manufacturing of a part includes delivering a plurality of successive layers of powder over a support. Delivering at least one layer includes imparting a spatially controllable electrostatic charge along a surface of a roller, depositing powder onto the surface of the roller, and moving the roller relative to a support such that the spatially controllable electrostatic charge on the surface of the roller causes transfer of a corresponding portion of the powder from the roller onto the support or an underlying layer of fused powder to provide an outermost layer of powder on the support.

Implementations of each method may include one or more of the following features. Imparting the spatially controllable electrostatic charge may include illuminating the roller with a light beam. A uniform charge may be induced on the roller, and the light beam may illuminate a photoconductive layer on the roller so as to discharge a portion of the charge on the roller to impart the spatially controllable electrostatic charge.

Implementations can provide one or more of the following advantages. Portions of a layer of powder can be removed in a spatially controllable manner after the layer of powder have been deposited using other, e.g., traditional, methods. Powder can be deposited on the surface of the platen or another underlying layer in a spatially controllable manner. This can permit greater control in fabrication of an object. An electrostatically charged roller can be faster than other techniques for selective depositing of powder, and therefore can provide improved throughput.

The details of one or more implementations are set forth in the accompanying drawings and the description below. Other aspects, features, and advantages of the invention will be apparent from the description and drawings, and from the claims.

DESCRIPTION OF DRAWINGS

Like reference symbols in the various drawings indicate like elements.

DETAILED DESCRIPTION

An additive manufacturing (AM) system can generate a part having complex geometries by selectively depositing, removing, and fusing powder (e.g., formed of a feed material) to form the final part. The AM system can deposit layers of powder onto a surface of a platen to produce features of a part. In some cases, the AM system can deposit a layer of the powder and selectively remove the powder to incorporate complex features into the part. The AM system can include a rotatable roller that rolls over the layer of the powder and selectively removes portions of the powder from the layer.

Alternatively or additionally, the AM system can selectively dispense a layer of the powder to incorporate the complex features into the part. The AM system can include a rotatable roller that rolls over the surface of the platen to selectively dispense portions of the layer of powder along the surface of the platen or along underlying layers of powder. The roller can also roll over layers of powder that have already been dispensed on the platen to deposit successive layers.

After selective dispensing of the powder—either by uniform dispensing and selective removal of the layer, or by selective dispensing of the layer—to form a selectively dispensed layer, the AM system can deliver energy to fuse the layer of the powder, e.g., to sinter or melt the powder together, to form a fused material. The AM system can execute the processes of selective material dispensing and fusing for successive layers to create complex features of the part.

In one example of an AM system, the AM system fabricates a part by, for each successive layer, dispensing the layer of powder onto a platen, selectively removing powder from the platen using a material removal roller, and fusing the powder remaining on the platen. The powder can be formed of a material that can be attracted to electrostatic charge, such that electrostatic forces cause the powder to be pulled onto the charged surface of the roller.

Figure 1:
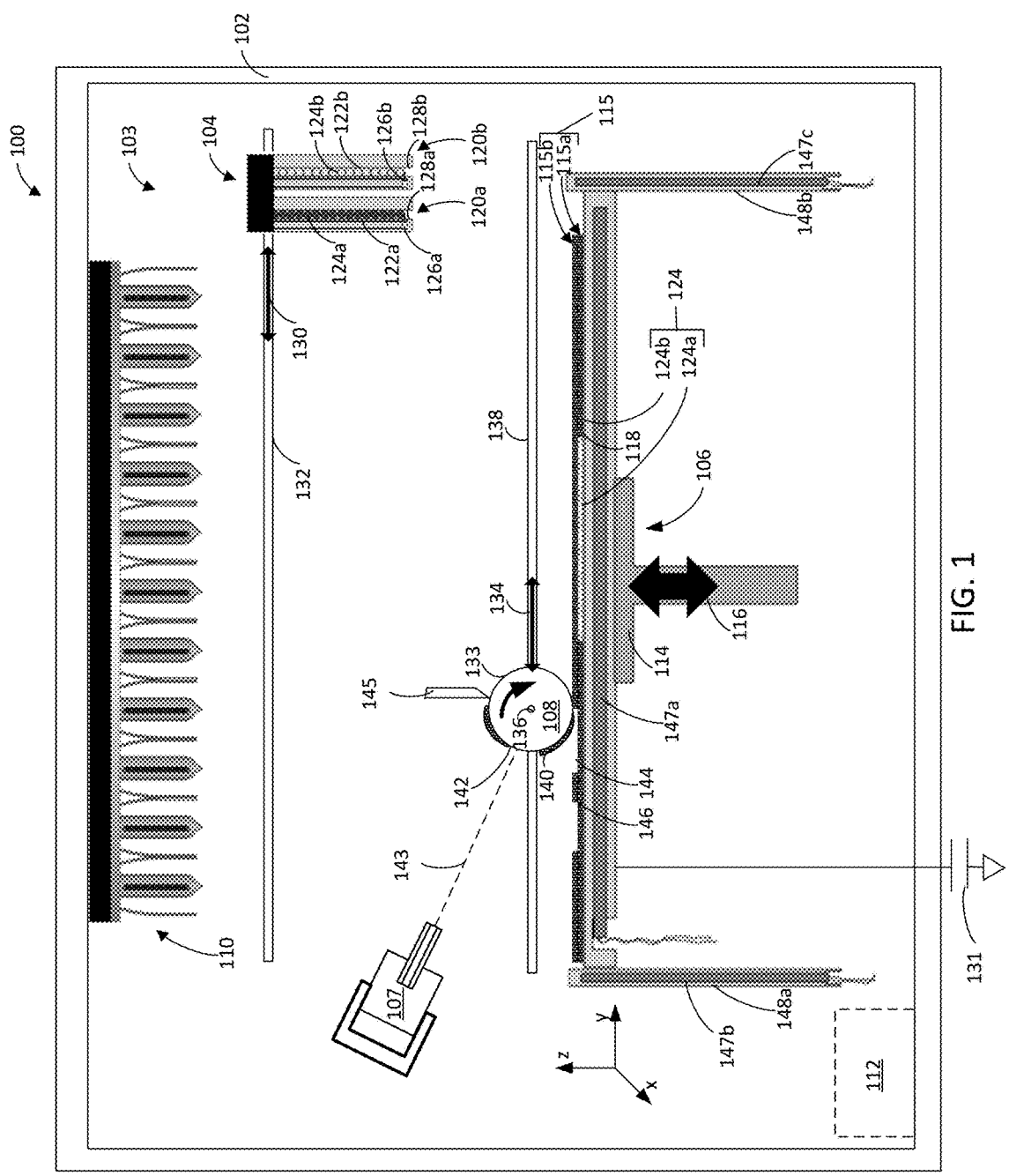
FIG. 1 is a schematic view of an additive manufacturing system including a material removal roller.

FIG. 1 shows an AM system 100 that uses electrostatic charges during an additive manufacturing process to fabricate a part. The AM system 100 includes a platen 106 to support the object being fabricated, a dispenser assembly 104 to deposit a layer of powder 124 over the platen, e.g., onto the platen 106 or onto an underlying layer, a material removal roller 108, an electron source 107 to control the electrostatic charge on the roller 108, and an energy source 110 to cause at least some portions of a layer of powder dispensed over the platen 106 to fuse.

The AM system 100 can includes a housing 102 defining an interior chamber 103. The housing 102 can encloses some components, e.g., the platen 106 and the dispenser assembly 104. Of course, some portions of the AM system 100, e.g., actuator or power supplies, can be positioned outside the housing 102.

The electron source 107 can be used to impart an electrostatic charge on a material removal roller 108. The material removal roller 108 can be used to remove the powder from the platen 106 based on a spatial distribution of the electrostatic charge. The energy source 110 can be a heat source within the housing 102 used to fuse the powder to form solid material that will become the part.

A controller 112 receives data from and transmits data to the subsystems of the AM system 100. The controller 112 can further process that data to generate instructions for the subsystems. By successively depositing powder, removing powder, and fusing the powder on the platen 106, the AM system 100 can fabricate a part having complex geometries and features. The controller 112 of the AM system 100 can receive and use computer aided design (CAD) data corresponding to the part to generate and transmit instructions to the various subsystems of the AM system 100. Using the CAD data, the controller 112 can generate instructions, for example, to dispense the powder using the dispenser assembly 104, to impart a spatially controllable electrostatic charge using the electron source 107, to selectively remove the powder using the material removal roller 108 after the electron source 107 has imparted the electrostatic charge, to fuse the powder using the energy source 110, among other processes implemented by the AM system 100. The controller 112 can further generate instructions from the CAD data to move various systems relative to one another. The controller may adjust the spacing between the roller and the platen based on charge, particle size and material type.

The housing 102 separates the interior chamber 103 from an outside environment to create an interior environment within the interior chamber 103 that reduces defects as the AM system 100 forms features of the part. The housing 102 can allow a vacuum environment, e.g., less than 1 Torr, e.g., 0.0001 Torr to 1 Torr, to be maintained in the chamber 103. Alternatively the interior of the chamber 103 can be a substantially pure gas, e.g., a gas that has been filtered to remove particulates, or the chamber can be vented to atmosphere. The vacuum environment or the filtered gas can reduce a likelihood of defects occurring during use of, for example, the dispenser assembly 104, the material removal roller 108, and the energy source 110.

The platen 106 serves as a support for the layers of powder and as a workspace and/or work surface for dispensing, removing, and fusing of the powder. The platen 106 can be vertically movable. The platen 106 supports powder dispensed on the platen 106 at a vertical position along the y-axis relative to the dispenser assembly 104. Based on instructions generated by the controller 112 using the CAD data, the controller 112 can control a drive system and/or actuator (not shown) to cause a piston 114 to move the platen 106 along a vertical axis 116 parallel to the y-axis.

Each successive layer of powder is supported by the underlying layer of powder. For example, as shown in FIG. 1, a first layer 115a of powder is supported by the platen 106, and a second layer 115b of powder is supported by the first layer 115a. As a result, as the dispenser assembly 104 dispenses successive layers of powder, the controller 112 can cause the piston 114 to move the platen 106 downward along the axis 116 so that the layer of powder can deposited on top of the underlying layers of powder and the platen 106. In one example, after the dispenser assembly 104 deposits the first layer 115a, the dispenser assembly 104 can deposit the second layer 115b over the underlying first layer 115a after moving the platen 106 downward along the axis 116 by an amount equal to the thickness of the first layer 115a.

The platen 106 can also include or serve as an electrostatically chargeable chuck that can be charged to have an electrostatic charge to attract the powder, thus retaining the layers of powder on the platen 106. For example, a voltage source 131 can be coupled to the platen 106. The voltage source 131 causes the electrostatic chargeable chuck to develop the electrostatic charge. The controller 112 can selectively cause charging or discharging of the platen 106 using the voltage source 131 to control when powder is attracted to the platen 106. For example, the controller 112 can control the voltage source 131 to set the charge on the platen 106 to attract the powder when the dispenser assembly 104 dispenses the powder onto the platen 106 and during the fusing step. However, the controller 112 can control the voltage source 131 to set the charge on the platen 106 at a level such that the spatially charged portions of the roller 108 will remove powder from the corresponding locations over the platen 106.

In some implementations, the dispenser assembly 104 can be positioned above the platen 106 and ejects the powder through an opening. For example, the dispenser assembly 104 can deliver powder particles in a carrier fluid, e.g. a high vapor pressure carrier, to form the layers of powder material. The carrier fluid can evaporate prior to fusing the powder 124 of the layer.

Although the dispenser assembly 104 can deliver a single kind of powder, in some implementations, the dispenser assembly 104 can store and dispense two or more different powders onto particular locations along a top surface 118 of the platen 106. The dispenser assembly 104 can include a first dispenser 120a having a first reservoir 122a to hold a first powder 124a, and a second dispenser 120b having a second reservoir 122b to hold a second powder 124b. The controller 112 can selectively open and close a gate 126a so that the first powder 124a flows through the first dispenser 120a through a first nozzle 128a, which ejects the first powder 124a onto the top surface 118 of the platen 106. The controller 112 can similarly open and close a gate 126b so that the second powder 124b flows through the second dispenser 120b through a second nozzle 128b, which ejects the second powder 124b onto the top surface 118 of the platen 106. The nozzles 128a, 128b precisely direct the powders 124a, 124b to particular locations on the top surface 118 through, for example openings defined by the nozzles 128a, 128b. Each opening can be associated with each of the gates 126a, 126b, which, as described herein, are independently controllable such that the powders 124a, 124b can be selectively deposited at particular locations on the top surface 118 of the platen 106.

The gates 126a, 126b of the dispensers 120a, 120b can selectively release the powders using, for example, piezoelectric printheads, a pneumatic valves, a microelectromechanical systems (MEMS) valves, solenoid valves, magnetic valves, or combinations thereof. The controller 112 can transmit electrical signals to each of the gates 126a, 126b to control the release of the powders 124a, 124b from the dispensers 120a, 120b.

During operation, the controller 112 can instruct the dispenser assembly 104 to move along one or more axes (e.g., an axis 130) parallel to the top surface 118 of the platen 106 to position the dispensers 120a, 120b above the particular locations where the dispensers 120a, 120b deposit the powders 124a, 124b. The dispenser assembly 104 can move along the axis 130 in either direction. The dispenser assembly 104 can be supported on a rail 132 that extends across the interior chamber 103 and along which the dispenser assembly 104 can move to deposit the powders 124a, 124b. The controller 112 can control a drive system and/or an actuator (not shown), e.g., a linear actuator, connected to the dispenser assembly 104 to move the dispenser assembly 104 along the rail 132.

In some implementations, the dispenser assembly 104 can move along a plane parallel to the top surface 118 of the platen 106 (e.g., along two perpendicular axes parallel to the top surface 118). The dispensers 120a, 120b can be single point dispensers and the dispensers 120a, 120b can be translated across x and y axes of the platen 106 to deposit a complete layer of the powder 124a, 124b on the platen 106 (e.g., a layer of powder that substantially covers the surface 118 of the platen 106). The nozzles 128a, 128b can define openings that allow the powders 124a, 124b to be deposited on a small point on the top surface 118. Alternatively, the dispensers 120a, 120b can be line dispensers that extend across the width of the platen 106, and the dispenser assembly 104 can be translated only along one dimension to deposit a complete layer of powder 124a, 124b on the platen. The nozzles 128a, 128b can define openings with widths that extend across the width of the platen 106 so that the nozzles 128a, 128b can eject the powders 124a, 124b across the width of the platen 106. As the dispenser assembly 104 moves along the plane parallel to the top surface of the platen 106, the nozzles can be configured to eject the powders 124a, 124b and move parallel to the top surface of the platen 106. As a result, the dispenser assembly 104 can deposit a uniform layer of powders 124a, 124b (e.g., a layer of powders having substantially uniform thickness) or can selectively dispense powders 124a, 124b within portions of the surface 118 of the platen 106.

Alternatively or in addition, in some implementations, the dispenser assembly 104 includes a powder delivery bed adjacent the platen 106, and a device, e.g., a blade or a roller, to push powder 124 from the delivery bed across the platen 106 to form the layer of the powder. For example, the blade or roller can be used to deposit a layer of a first powder 124a uniformly over the platen. The roller 108 can then selectively remove powder from the deposited layer using the processes described herein. The dispenser assembly 104 can then selectively deposit a second powder 124b of different composition into portions of the layer removed by the roller 108.

The controller 112 can control the dispenser assembly 104 to deliver powder 124 to selected locations over the platen 106. For example, for successive layers deposited by the dispenser assembly 104, the controller 112 can control the dispenser assembly 104 such that the powder 124 is delivered only over locations along the surface 118 of the platen 106 where an underlying layer remains, e.g., where the powder 124 was not previously removed by the roller 108. The underlying layer (e.g., the first layer 115a) can thus support the overlying layer (e.g., the second layer 115b)

The AM system 100 can selectively remove deposited material from the top layer of powder (e.g., the second layer 115b of FIG. 1) deposited by the dispenser assembly 104 using the material removal roller 108. The electron source 107 can include a focused energy source to emit a beam 143 of energy that can generate a spatially controllable electrostatic charge on a surface 133 of the roller 108 that facilitates selective removal of the powder from the top layer of powder.

In some implementations, initially a uniform spatial charge is induced on the surface 133 of the roller 108. For example, a coronal discharge unit can be used to impart a uniform charge on the roller 108. In addition, the roller 108 can include a photoconductive layer. In this case, the electron source 107 can include a light source to illuminate the roller 108 using a beam 143 of light, and hence the photoconductive layer, to selectively discharge the surface 133 where the photoconductive layer is illuminated. The light source can thus generate the spatially controllable electrostatic charge on the surface 133 of the roller 108. The light source can emit a light beam 143 that is scanned across a width of the roller 108. As the roller 108 rotates and the beam is scanned across the width, the power of the light beam 143 can be modulated such that the light beam 143 can selectively impart the spatially controllable electrostatic charge on the surface 133.

In some implementations, the electron source 107 can include an electron gun that emits a beam 143 of electrons to generate the spatially controllable electrostatic charge on the surface 133 of the roller 108. The AM system 100 can control a spatial distribution of the electrostatic charge along a portion of the surface 133 of the roller 108 by controlling headings of the electrons emitted by the electron gun as the electrons travel toward the surface 133 of the roller 108. For example, the AM system 100 can include electrostatic plates (not shown in FIG. 1) having electrostatic charges that the controller 112 can modulate to cause the electrons to travel at a specific angle from the electron gun. For example, the electron beam 143 can be scanned across a width of the roller 108. As the roller 108 rotates and the beam is scanned across the width, the beam 143 can be selectively deflected, such that the electron beam 143 can selectively impart the spatially controllable electrostatic charge on the surface 133.

After the spatially controllable electrostatic charge is placed on the surface 133 of the roller, as the roller 108 rolls along the top layer of powder (e.g., the second layer 115b of FIG. 1), the electrostatic charge causes the powder 124 to be attracted to the material removal roller 108 and be transferred from the top layer of powder on the surface 118 of the platen 106 to the material removal roller 108. After the roller 108 has completed a rolling operation in which the roller 108 has traversed a portion of a layer of powder, the roller 108 can be discharged to allow the roller 108 to complete a subsequent roller operation to traverse another portion of the layer of powder. The electron source 107 can then impart a new spatial distribution of electrostatic charge such that, for the next portion of the layer of powder, a new pattern of powder 124 can be removed. Once the roller 108 has traversed an entire layer, the dispenser assembly 104 can deposit a subsequent layer of powder, and the roller 108 can execute rolling operations on the subsequent layer of powder to remove portions of powder from the layer.

To remove powder deposited by the dispenser assembly 104, the controller 112 can cause the roller 108 to move along or traverse the top layer of powder 124 deposited on the platen 106 or deposited on top of lower layers of powder (e.g., the first layer 115a of powder of FIG. 1). The material removal roller 108 can translate along an axis 134 parallel to the top surface 118 of the platen 106 by rolling along layers of powder (e.g., the second layer 115b of powder). The roller 108 is rotatable, thus allowing a drive system and/or an actuator (not shown) to cause the roller 108 to rotate about a roller axle 136 supported by a rail 138.

When the roller 108 contacts a layer of powder as the roller 108 rotates about the roller axle 136, rolling friction between the powder and the roller 108 can cause the roller 108 to translate along the axis 134. In some cases, the actuator can additionally or alternatively drive a linear actuator that causes the roller 108 to move along the axis 134. The roller 108 can thus be movable parallel to the top surface 118 of the platen 106.

In some examples, the roller 108 can have a width that extends across a width of the platen 106 such that the roller 108 can translate across the platen 106 in one direction to remove the selected portions of the layer of powder 124. For each rolling operation, the roller 108 can traverse part of the layer of powder in one direction. The roller 108 can continue rolling operations until the roller 108 has traversed the entire length of the platen 106.

Alternatively or additionally, the roller 108 can have a circumference that is substantially equal to a length of the platen 106. Thus, the surface 133 of the roller 108 can have a one-to-one mapping onto the surface 118 of the platen 106, allowing the spatial distribution of the electrostatic charge on the surface 133 for one rolling operation to control a distribution of powder 124 removed from a single layer of powder when the roller 108 rolls over a layer of powder 124. The surface 133 of the roller 108 can have an area that is substantially equal to or greater than an area of the surface 118 of the platen 106 such that cylindrical projection of the surface 133 into a two-dimensional plane matches the surface 118.

In other examples, the roller 108 can have a width less than the width of the platen 106. A linear actuator can translate the roller 108 in an axis perpendicular to the axis 134 such that the roller 108 can move across a width of the platen 106 after the roller 108 has completed a lengthwise traversal. In some implementations, a circumference of the roller 108 is less than the length of the platen 106 such that a full rotation of the roller 108 only covers a portion of the platen 106. As a result, for each rolling operation to remove a portion of a layer of powder 124 on the platen 106, the roller 108 can be selectively charged with a specific pattern of electrostatic charge for each portion of the layer and then discharged in preparation for receiving the spatially controllable electrostatic charge for the next portion of the layer.

As the roller 108 rolls along the top layer of powder, the roller 108 collects powder based on the spatial distribution of the electrostatic charge that the electron source 107 imparted on the portion of the surface 133 of the roller 108. The powder 124, which can be formed of a material attracted to the electrostatic charge, is attracted towards the electrostatically charged portions of the surface 133 of the roller 108. The spatial distribution of the electrostatic charge on the surface 133 of the roller 108 causes the roller 108 to have charged portions (e.g., a charged portion 140) that remove the powder 124 and uncharged portions (e.g., an uncharged portion 142) that do not remove powder 124.

In one example, the charged portion 140, when placed in close proximity to the powder 124, generates a force between the charged portion 140 and the powder 124 on the surface 118 of the platen 106 that attracts the powder 124 on the surface 118 toward the surface 133 of the roller 108. The uncharged portion 142 does not include the electrostatic charge imparted by the electron source 107 and thus does not attract the powder 124. In the example as shown in FIG. 1, as the roller 108 rolls over the second layer 115b, the roller 108 collects powder 124 as the charged portion 140 contacts the second layer 115b but does not collect powder 124 as the uncharged portion 142 contacts the second layer 115b. As a result, the second layer 115b includes a removed portion 144 (e.g., a portion in which the powder 124 is removed from the surface 118) corresponding to the charged portion 140 and a preserved portion 146 (e.g., a portion in which the powder 124 is preserved on the surface 118) corresponding to the uncharged portion 142.

In some implementations, the AM system 100 can include a blade 145 to remove powder 124 from the surface 133 of the roller 108 such that the roller 108 can be used for a subsequent rolling operation in which the roller 108 removes another portion of the powder 124 from a layer of powder. The blade 145 can scrape the powder off the roller into a collection tray.

A trailing roller can be used for compaction of the layer of powder.

Each layer 115 extend in two dimensions along the surface 118 of the platen 106, and the electrostatic charge on the surface 133 of the roller 108 controls the distribution of the powder 124 along the two dimensions of each of the layers 115 atop of the surface 118 of the platen 106. The layers 115 also each have a thickness between, for example, 20-150 µm. The electron source 107 is configured to impart a spatial distribution of the electrostatic charge that can independently control whether, for each layer 115, each portion of the powder 124a on a lower layer of powder (e.g., the first layer 115a) is removed or preserved.

The controller 112 can generate instructions for the electron source 107 and the roller 108 to control which portions of the powder 124 are removed and preserved each layer of powder deposited on the platen 106. The instructions from the controller 112 transmitted to the roller 108 and the electron source 107 can ensure a specific spatial distribution of the electrostatic charge on the surface 133 of the roller 108 that corresponds to a geometry of a layer of the part. In one example, to deposit a portion of the layer of powder, the instructions can cause a specific spatial distribution of the electrostatic charge by controlling rotation of the roller 108, movement of the electron source 107, and activation of the electron source 107. The instructions can further instruct the actuator of the roller 108 to roll over the powder 124 to remove portions of the powder 124. As a result, the actuator can be configured to move the roller relative to the platen 106 such that the spatially controllable electrostatic charge on the surface 133 of the roller 108 causes removal of a corresponding portion of an outermost layer of powder on the platen 106. In some cases, the instructions can also instruct the piston 114 to raise or lower the platen 106 such that the top layer of powder 124 are in contact or near contact with the roller 108.

In one example of selectively placing the first and second powders 124a, 124b onto the platen 106 within a layer of the feed materials, the dispenser assembly 104 can place a uniform layer of the first powder 124a. The roller 108 can then remove portions of the first powder 124a. The dispenser assembly 104 can then place the second powder 124b into the portions from which the first powder 124a was removed from the uniform layer, thus forming a layer (e.g., the first layer 115a) having distinct portions of the first powder 124a and the second powder 124b. In such an example, the first powder 124a can be supporting material for the second powder 124b, which can serve as the substrate for the part to be fabricated.

In some cases, the electrostatically chargeable chuck can be segmented into portions such that the electrostatic charge can be controlled for each portion of the chuck. The electrostatically chargeable chuck can thus include several voltage sources (e.g., the voltage source 131) corresponding to each of the portions. In such an example, the roller 108 can include a uniform distribution of electrostatic charge, and the electrostatic charge on the chuck can be increased for portions of the layer of the powder that will be preserved and can be decreased for portions of the layer of the powder that will be removed. The electrostatic charge on the roller 108 can generate an electrostatic force that is sufficiently high to cause powder to overcome the electrostatic force from the chuck and to be transferred from the platen 106 to the roller 108. Thus, when the roller 108 rolls over the layer of powder deposited on the platen 106, the roller 108 removes the portions of the layer of powder overlying the portions of the platen 106 having a lower electrostatic charge.

During manufacturing, layers of feed materials are progressively deposited and fused. The powder 124a can be heated and fused to form a solid mass of material that becomes portions of the part fabricated by the AM system 100. The platen 106 can be heated by an embedded heater 147a to a base temperature that is below the melting points of both the first and second feed materials. The platen 106 can also include side walls 148a, 148b that are each heated by heaters 147b and 147c, respectively. The heaters 147a, 147b, 147c can cooperate to increase the base temperature of the platen 106. The controller 112 can control an amount of power delivered to the energy source 110 to impart sufficient energy to melt the first feed material without melting the second feed material. In this way, the energy source 110 can be configured to provide a smaller temperature increase to the deposited material to selectively melt the first feed material. Transitioning through a small temperature difference can enable each deposited layer of feed materials to be processed more quickly. For example, the base temperature of the platen 106 can be about 1500° C. and the energy source 110 can be triggered to impart energy to cause a temperature increase of about 50° C.

The energy source 110 can be positioned above the platen, i.e., on the same side of the platen 106 on which the feed material is deposited, and spaced away sufficiently from the platen 106 so that the dispenser assembly 104 and the roller 108 can pass between the platen 106 and the energy source 110. The energy source 110 can be configured to raise the temperature of an entire deposited layer simultaneously. For example, the energy source 110 can be a two-dimensional array of heater lamps. The lamp array can be configured to fuse substantially all of the outermost layer (e.g., the topmost or top layer) of powder. As another example, the energy source 110 can be a digitally addressable heat source in the form of an array of individually controllable light sources, e.g., a vertical-cavity surface-emitting laser (VCSEL) chips. The array of controllable light sources can be a linear array which is scanned across the substrate surface, or a full two-dimensional array, like a DMD, which selectively preheats areas according to which chip is addressed.

Thus, the AM system 100 can deposit successive layers (e.g., the first layer 115a, the second layer 115b, and subsequent layers) that can be formed into the part defined by the CAD data. The dispenser assembly 104 can deliver the successive layers of powder over the platen 106. The successive layers can include a bottom layer (e.g., the first layer 115a) deposited on the platen 106 and remaining layers (e.g., the second layer 115b and subsequent layers) can each be deposited on an underlying layer of fused powder. The controller 112 can use the CAD data to generate the instructions to deposit the powder, remove the powder, and fuse the powder for each layer of powder. Each layer of powder can correspond to a layer of the part. Thus, by spatially controlling a distribution of charge on the roller 108, the controller 112 can control a geometry of the part generated by the processes and systems described herein.

In some implementations, an AM system fabricates a part by selectively depositing successive layers of powder onto a platen and fusing the powder on the platen. An AM system 200 shown in FIG. 2 includes a platen 206 to support the object being fabricated, a material dispensing roller 208 to deposit a layer of powder over the platen 206, e.g., onto the platen 206 or onto an underlying layer, an electron source 207 to control the electrostatic charge on the roller 208, and a energy source 210 to cause at least some portions of a layer of powder dispensed over the platen 206 to fuse.

The AM system 200 can also include a housing 202 defining an interior chamber 203. The housing 202 can enclose some components of the AM system 200, e.g., the platen 206 and the material dispensing roller 208. Of course, some portions of the AM system 200, e.g., actuator or power supplies, can be positioned outside the housing 202.

The electron source 207 can be used to impart an electrostatic charge on a material dispensing roller 208. The material dispensing roller 208 can be used to deposit the powder on the platen 206 based on a spatial distribution of the electrostatic charge imparted on the roller 208. The spatially controllable electrostatic charge is used to attract powder onto the roller 208 in the spatially controllable pattern. The spatially controllable pattern of powder on the roller 208 can then be transferred to the platen or previously dispensed layer. The energy source 210 can be a heat source within the housing 202 used to fuse the powder to form solid material that will become the part.

A controller 212 receives data from and transmits data to the subsystems of the AM system 200. The controller 212 can further process that data to generate instructions for the subsystems. By successively depositing powder and fusing the powder on the platen 206, the AM system 200 can fabricate a part having complex geometries and features.

The controller 212 of the AM system 200 can receive and use CAD data corresponding to the part to generate and transmit instructions to the various subsystems of the AM system 200. Using the CAD data, the controller 212 can generate instructions to, for example, impart a spatially controllable electrostatic charge to the roller 208 using the electron source 207. The controller 212 can also generate instructions to other components of the AM system 200, such as to dispense powders using the material dispensing roller 208, and to sinter the powders using the energy source 210, among other processes of the AM system 200. The controller 212 may adjust the spacing between the roller and the platen based on charge, particle size and material type.

The housing 202 separates the interior chamber 203 from an outside environment to create an interior environment within the interior chamber 203 that reduces defects as the AM system 200 forms features of the part. The housing 202 can allow a vacuum environment, e.g., less than 2 Torr, e.g., 0.0001 Torr to 2 Torr, to be maintained in the chamber 203. Alternatively the interior of the chamber 203 can be a substantially pure gas, e.g., a gas that has been filtered to remove particulates, or the chamber can be vented to atmosphere. The vacuum environment or the filtered gas can reduce a likelihood of defects occurring during use of, for example, the material dispensing roller 208, and the energy source 210.

Figure 2:
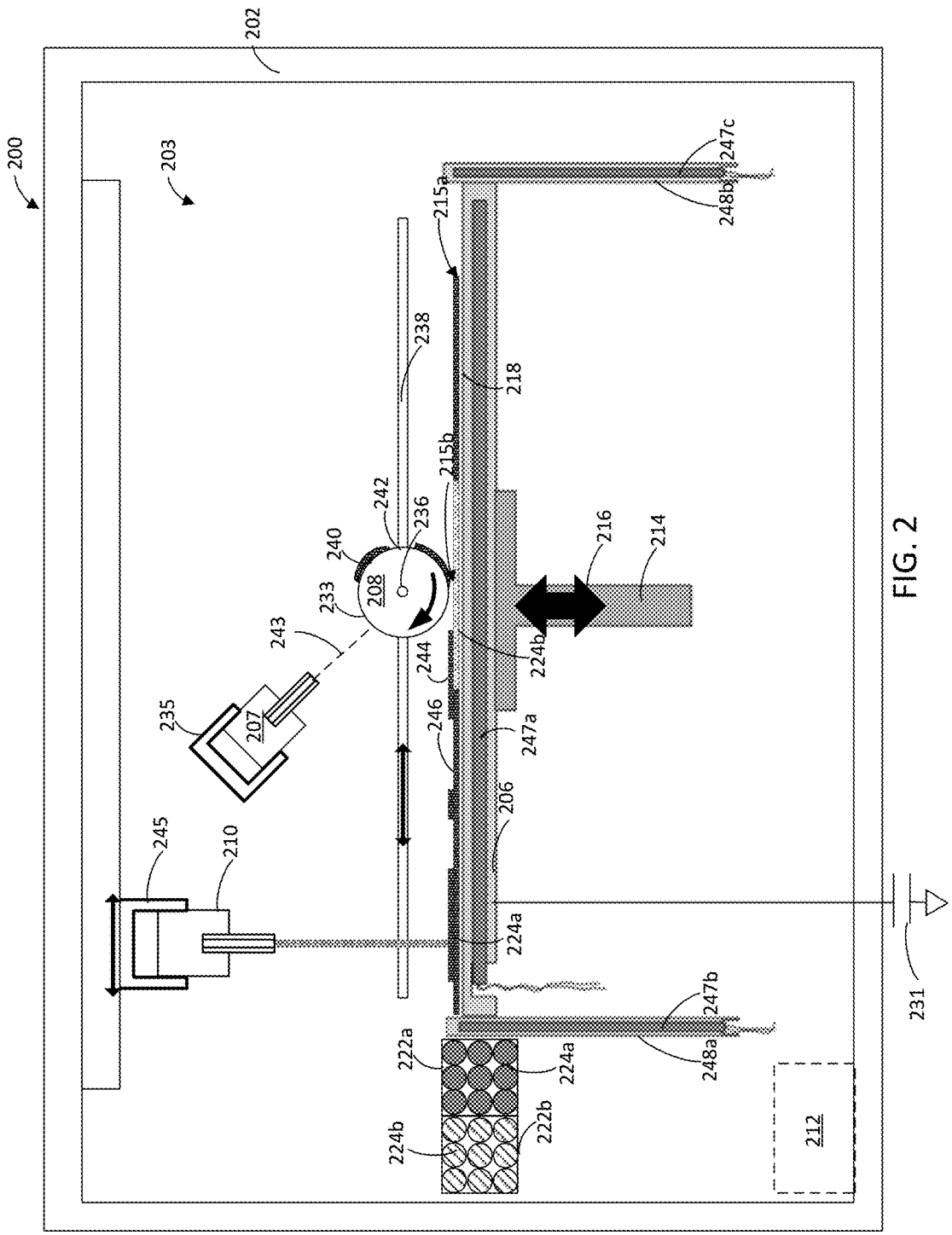
FIG. 2 is a schematic view of an additive manufacturing system including a material dispensing roller.

The platen 206 serves as a support for the layers of powder and as a workspace and/or work surface for dispensing, removing, and fusing of the powder. The platen 206 can be vertically movable. The platen 206 supports the powder dispensed on the platen 206 at a vertical position along the y-axis relative to the material dispensing roller 208. Based on instructions generated by the controller 212 using the CAD data, the controller 212 can control a drive system (not shown) to cause a piston 214 to move the platen 206 along an axis 216 parallel to the y-axis. Each successive layer of power (e.g., a first layer 215a of powder and a second layer 215b of powder as shown in FIG. 2) is supported by the underlying layer of powder. As a result, as the roller 208 dispenses successive layers of powder, the controller 212 can cause the piston 214 to move the platen 206 downward along the axis 216 by an amount equal to the thickness of the first layer 215a so that the layer of powder can be dispensed on top of the underlying layers of powder and the platen 206.

The platen 206 can also include or serve as an electrostatically chargeable chuck that can be charged to have an electrostatic charge to attract the powder, thus forming layers of powder on the platen 206. For example, a voltage source 231 can be coupled to the platen 206. Voltage delivered by the voltage source 231 can induce an electrostatic charge on the platen 206. The controller 212 can use the voltage source 231 to selectively charge or discharge the chuck of the platen 206 to control when the powder is attracted to the platen 206. The controller 212 can control the charge on the platen 206 relative to the charge on the roller 208 to cause the powder on the roller 208 to be transferred onto the platen 206.

Generally, the AM system 200 can collect and deposit material to form a top layer of powder (e.g., the second layer 215b of FIG. 2) using a dispenser or dispensing system that includes the material dispensing roller 208. The electron source 207 can include a focused energy source to emit a beam 243 of energy that can generate a spatially controllable electrostatic charge on a surface 233 of the roller 208 that facilitates selective depositing of powder onto the platen 206.

In some implementations, initially a uniform spatial charge is induced on the surface 233 of the roller 208. For example, a coronal discharge unit can be used to impart a uniform charge on the roller 208. In addition, the roller 208 can include a photoconductive layer. In this case, the electron source 207 can include a light source to emit a beam 243 of light. The beam 243 of light illuminates the roller 208, and hence the photoconductive layer, to selectively discharge the surface 233 where the photoconductive layer is illuminated, and thus generate the spatially controllable electrostatic charge on the surface 233 of the roller 208. The light source can emit a light beam 243 that is scanned across a width of the roller 208. Thus, as the roller 208 rotates and the beam 243 is scanned across the width of the roller, the light beam 243 can be modulated to impart the spatially controllable electrostatic charge on the surface 233.

In some implementations, the electron source 207 can include an electron gun that emits a beam 243 of electrons to generate the spatially controllable electrostatic charge on the surface 233 of the roller 208. The AM system 200 can control a spatial distribution of the electrostatic charge along a portion of the surface 233 of the roller 208 by controlling headings of the electrons emitted by the electron gun. For example, the AM system can include electrostatic plates that cause the electrons to travel at an angle from the electron gun. For example, the electron beam 243 can be scanned across a width of the roller 208. As the roller 208 rotates and the beam is scanned across the width, the beam 243 can be selectively deflected, such that the electron beam 243 can selectively impart the spatially controllable electrostatic charge on the surface 233.

Although the roller 208 can dispense a single powder, in some implementations, the roller 208 can dispense two or more different powders onto particular locations along a top surface 218 of the platen 206. For example, a first reservoir 222a of the dispensing system holds the first powder 224a, and a second reservoir 222b of the dispensing system holds a second powder 224b. The controller 212 can position the roller 208 to contact the first powder 224a in the first reservoir 222a or the second powder 224b in the second reservoir 222b. The spatially controllable charge on the roller 208 can generate a force between the powders 224a, 224b and the roller 208 such that the roller 208 can carry the powders 224a, 224b on the surface 233 of the roller 208.

In some implementations, the AM system 200 can include an additional reservoir dispenser (e.g., the dispenser assembly 104 of FIG. 1) that dispenses the powder 224a onto the surface 233 of the roller 208. The portions of the surface 233 that were charged by the electron source 207 collect the powder 224a as the dispenser dispenses the powder 224a onto the surface 233. The dispenser can also be movable such that the controller 112 can control the dispenser to dispense the powder 224a on different portion of the roller 208. The dispenser can additionally or alternatively dispense the powder 224b. The dispenser can include the reservoirs 222a, 222b to contain the powders 224a, 224b.

After the surface 233 has collected the powder 224, the roller 208 can selectively deposit the powder 224 on the platen 206 collected from, for example, the reservoir 222 or the dispenser. The roller 208 can deposit a portion of the topmost layer. As the roller 208 rolls along the platen 206 or the top layer of powders on the platen 206, the platen 206 can be electrostatically charged relative to the roller 208 such that the powder 224 is attracted toward the platen 206. For example, the electrostatic charge of the platen 206 can cause an electrostatic force on the powder 224 that is sufficiently great to overcome the electrostatic force on the powder 224 generated by the electrostatic charge of the roller 208. As a result, the powder 224 are transferred from the surface 233 of the roller 208 to platen 206 or the top layer of powders on the platen 206.

After the roller 208 has completed a rolling operation in which the roller 208 has traversed a portion of a layer of powder, the roller 208 can be discharged to allow the roller 208 to complete a subsequent roller operation to traverse another portion of the layer of powder. The electron source 207 can then impart a new spatial distribution of electrostatic charge so that a subsequent rolling operation can dispense a portion of powder, a new pattern of the powder 224 can be deposited to form a subsequent patterned layer on the platen 206. The electron source 207 can then impart a new spatial distribution of electrostatic charge such that, for the next portion of the layer of powder, the roller 208 can dispense a new pattern of powder 224. Once the roller 208 has traversed an entire area of the platen 206, the roller 208 can execute rolling operations to dispense a new layer of powder.

To deposit the powder 224 on the platen 206 using the roller 208, the controller 212 can cause the roller 208 to move along the surface 218 of the platen 206 or the top layer of powders deposited on the platen 206 while the platen 206 is electrostatically charged. The electrostatic charge on the platen 206 causes lower layers of the powders to remain on the platen 206 as the roller 208 approaches the platen 206. The electrostatic charge on the platen 206 further attracts the powder 224 on the surface 233 of the roller 208 so that the powder 224 on the surface 233 are transferred from the surface 233 to the surface 218 of the platen 206. The roller 208 can translate along an axis 234 parallel to the top surface 218 of the platen 206 by rolling along layers of powders or the top surface 218 of the platen 206. The roller 208 is rotatable, and thus, an actuator or drive system (not shown) can cause the roller 208 to rotate about a roller axle 236 supported by a rail 238. When the roller 208 contacts a layer of powder as the roller 208 rotates about the roller axle 236, rolling friction between the powder and the roller 208 can cause the roller 208 to translate along the axis 234. In some cases, the actuator can additionally or alternatively drive a linear actuator that causes the roller 208 to move along the axis 234. The roller 208 can thus be movable parallel to the top surface 218 of the platen 206.

In some examples, the roller 208 can have a width that extends across a width of the platen 206 such that the roller 208 can translate across the platen 206 in one direction to dispense the powder 224. For each rolling operation, the roller 208 can traverse part of the layer of powder or part the surface 218 of the platen 206 in one direction. The roller 208 can continue rolling operations until the roller 208 has traversed the entire length of the platen 206.

Alternatively or additionally, the roller 208 can have a circumference that is substantially equal to a length of the platen 206. Thus, the surface 233 of the roller 208 can have a one-to-one mapping onto the surface 218 of the platen 206, allowing the spatial distribution of the electrostatic charge on the surface 233 for one rolling operation to control a distribution of powder 224 dispensed to form a single layer of powder when the roller 208 rolls over a layer of powder 224. The surface 233 of the roller 208 can have an area that is substantially equal to or greater than an area of the surface 218 of the platen 206 such that cylindrical projection of the surface 233 into a two-dimensional plane matches the surface 218.

In other examples, the roller 208 can have a width less than the width of the platen 206. A linear actuator can translate the roller 208 in an axis perpendicular to the axis 234 such that the roller 208 can move across a width of the platen 206 after the roller 208 has completed a lengthwise traversal. In some implementations, a circumference of the roller 208 is less than the length of the platen 206 such that a full rotation of the roller 208 only covers a portion of the platen 206. As a result, for each rolling operation to dispense a layer of powder 224 on the platen 206, the roller 208 can be selectively charged with a specific pattern of electrostatic charge for each portion of the layer and then discharged in preparation for receiving the spatially controllable electrostatic charge for the next portion of the layer.

As the roller 208 rolls along the platen 206, the roller 208 deposits the powder 224 forming a layer of powder 224 based on the distribution of the powder 224 collected on the surface 233 due to the spatial distribution of the electrostatic charge that the electron source 207 imparted on portions of the surface 233 of the roller 208. The powder 224, which can be formed of a material attracted to the electrostatic charge, are forced towards the electrostatically charged portions of the surface 233 of the roller 208 when the roller 208 is positioned near the reservoirs 222. In some cases, the dispenser can directly dispense the powder 224 onto the roller 208. The electron source 207 thus imparts the spatial distribution of the electrostatic charge on the surface 233 of the roller 208, thus causing the roller 208 to have charged portions (e.g., a charged portion 240) that collect the powder 224 and uncharged portions (e.g., an uncharged portion 242) that do not collect the powder 224.

In one example, the charged portion 240, when placed in close proximity to the powder 224, generates a force between the charged portion 240 and the powder 224 that attracts the powder 224 toward the surface 233 of the roller 208. The uncharged portion 242 does not include the electrostatic charge imparted by the electron source 207 and thus does not attract the powder 224.

In the example as shown in FIG. 2, as the roller 208 is positioned near the reservoir 222a, the roller 208 collects powder 224 at the charged potion 240 but does not collect the powder 224a at the uncharged portion 242. When the roller 208 is then rolled over the electrostatically charged platen 206, the powder 224 is attracted toward the platen 206 due to an electrostatic force between the platen 206 and the powder 224 that is greater than the electrostatic force of attraction between the powder 224 and the charged portion 240. The layer of powders deposited on the platen 206 thus includes a powdered portion 244 corresponding to the charged portion 240 and an unpowdered portion 246 corresponding to the uncharged portion 242. As described herein, alternatively or additionally, the dispenser can dispense powder 224a onto the roller 208, and the powder 224a dispensed will be localized to the charged portions of the roller 208.

In some implementations, the AM system 200 can include a blade to remove powder 224 from the surface 233 of the roller 208 to clear excess powder on the roller 208. The blade can scrape the powder off the roller into a collection tray Each layer 215 of powder 224 extends in two dimensions along the surface 218 of the platen 206, and the electrostatic charge on the surface 233 of the roller 208 controls the distribution of the powder 224 along the two dimensions of each of the layers 215. Each layers 215 can have a thickness between, for example, 20-150 µm. The electron source 207 is configured to impart a spatial distribution of the electrostatic charge that can independently control whether the roller 208 deposits a portion of powder on the top layer.

The controller 212 can generate instructions for the electron source 207 and the roller 208 to control transfer of the powder 224 from the reservoir or the dispenser to the surface 233 of the roller 208. The instructions from the controller 212 transmitted to the roller 208 and the electron source 207 can ensure a specific spatial distribution of the electrostatic charge on the surface 233 of the roller 208 that corresponds to a geometry of a layer of the part. The instructions, for each portion of the powder 224 deposited on the platen 206 or on an underlying layer of powder, can cause a specific spatial distribution of the electrostatic charge by controlling rotation of the roller 208, angle of electrons emitted by the electron source 207, and activation of the electron source 207. The instructions can further instruct the actuator of the roller 208 to roll over the surface 218 of the platen 206 or subsequent layers of powder deposited on the platen 206. As a result, the actuator can be configured to move the roller 208 relative to the platen 206 such that the spatially controllable electrostatic charge on the surface 233 of the roller 208 causes transfer of a corresponding portion of the powder 224 from the roller 208 onto the surface 218 of the platen 206 or the underlying layer of powder to provide an outermost layer of powder on the platen 206. In some cases, the instructions can also instruct the piston 214 to raise or lower the platen 206 such that the top layer of powder 224 is in contact or near contact with the roller 208.

In some cases, the controller 212 can transmit instructions to control an amount of electrostatic charge on the chuck of the platen 206 to modulate power use by the platen 206. The platen 206 can be charged while the roller 208 dispenses the powder 224 onto the surface 218 of the platen 206 and discharged after the roller 208 dispenses the powder 224.

In some cases, the chuck can be segmented into portions such that the electrostatic charge can be controlled for each portion. In such an example, the roller 208 can include a uniform distribution of electrostatic charge, and the electrostatic charge on the chuck can be increased for portions of the platen 206 that will receive the powder 224a to form the part. The electrostatic charge on the chuck can be decreased for portions of the platen 206 that will not receive the powder 224. Thus, when the roller 208 rolls over the surface 218 of the platen 206 or subsequent layers of powder deposited on the platen 206, the roller 208 deposits the powder 224 on portions of the platen 206 having a higher electrostatic charge.

During manufacturing, layers of feed materials are progressively deposited and fused. The powder 224 can be heated and fused to form a solid mass of material that becomes portions of the part fabricated by the AM system 200. The platen 206 can be heated by an embedded heater 247a to a base temperature that is below the melting points of both the first and second feed materials. The platen 206 can also include side walls 248a, 248b that are each heated by heaters 247b and 247c, respectively. The heaters 247a, 247b, 247c can cooperate to increase the base temperature of the platen 206. The controller 212 can control an amount of power delivered to the energy source 210 to impart sufficient energy to melt the first feed material without melting the second feed material. In this way, the energy source 210 can be configured to provide a smaller temperature increase to the deposited material to selectively melt the first feed material. Transitioning through a small temperature difference can enable each deposited layer of feed materials to be processed more quickly. For example, the base temperature of the platen 206 can be about 2500° C. and the energy source 210 can be triggered to impart energy to cause a temperature increase of about 50° C.

The energy source 210 can be positioned above the platen, i.e., on the same side of the platen 206 on which the feed material is deposited, and spaced away sufficiently from the platen 206 so that the material dispensing roller 208 can pass between the platen 206 and the energy source 210. As shown in FIG. 2, the energy source 210 can be a focused energy source, such as a laser, that can be configured to scan the outermost layer (e.g., the top or topmost layer) of powder on the platen 206. A robot 245 can control a position of the energy source 210 along a horizontal plane parallel to the surface 218 of the platen 206 such that the energy source 210 can fuse specific locations of the powder. As the laser scans the powder using a beam of focused energy, the temperature of the powder increases, fusing the powder at a small area contacted by the beam such that the powder in the vicinity of that small area form a solid mass of material.

The AM system 200 can deposit the successive layers (e.g., the first layer 215a, the second layer 215b, and subsequent layers) that can be formed into the part defined by the CAD data. After the energy source 210 fuses the powder of each layer, the roller 208 can roll over the fused layers to deposit a new layer of unfused powder. As a result, underlying layers over which roller 208 rolls can be formed of fused powder. Thus, the dispenser including the material dispensing roller 208 can be configured to deliver successive layers of powder over the platen 206. The successive layers can include a bottom layer (e.g., the first layer 215a) deposited on the platen 206. Remaining layers (e.g., the second layer 215b and subsequent layers above the second layer 215b) can each be deposited on an underlying layer of fused powder. The controller 212 can use the CAD data to generate the instructions to selectively deposit and fuse the powder for each layer of powder. Each layer of powder can correspond to a layer of the part. By spatially controlling a distribution of charge on the roller 208, the controller 212 can control a geometry of the part generated by the processes and systems described herein.

AM systems (e.g., AM system 100 of FIG. 1 and AM system 200 of FIG. 2) and their respective subsystems can be combined in any proper combination to provide an additive manufacturing system that can selectively deposit, selectively remove, and selectively fuse powders on a surface of a platen. An AM system can include a roller that functions as both a material removal roller (e.g., the roller 108 of the AM system 100) and a material dispensing roller (e.g., the roller 208 of the AM system 200). An AM system can include a point-based energy source (e.g., the energy source 210 of the AM system 200) or an area-based energy source (e.g., the energy source 110 of the AM system 100).

Figure 3:
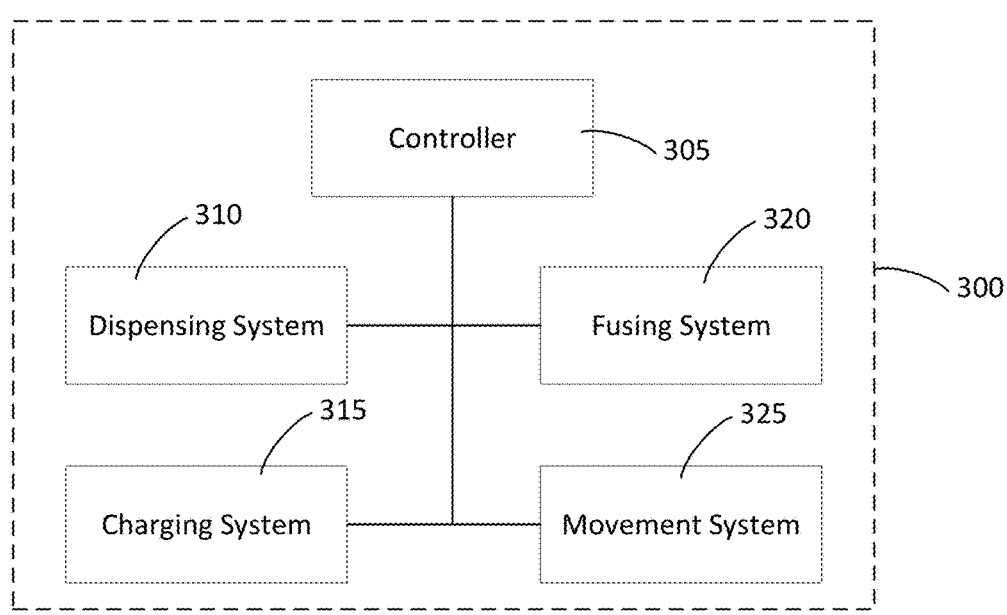
FIG. 3 is a block diagram of an additive manufacturing system.

As shown in FIG. 3, an AM system 300 includes a controller 305 that operates the AM system 300 to execute various AM processes of the AM system 300. The controller 305 receives CAD data that the controller can use to generate instructions for each of the sub-systems of the AM system 300. The controller 305 controls the various sub-systems using these instructions.

The controller 305 can transmit instructions to a dispensing system 310 that deposits powder (e.g., metal powders, feed materials) onto a work surface (e.g., the platen 106 of the AM system 100, the platen 206 of the AM system 200). The work surface can be a platen that supports the powder and layer-by-layer fabrication of a part. The dispensing system 310 can selectively deposit a layer of powder on the work surface such that some portions include powder and some portions do not include powder. In some implementations, the dispensing system 310 can deposit a uniform layer of materials on the work surface and then selectively remove portions from the uniform layer of materials. The dispensing system 310 can include a dispenser assembly (e.g., the dispenser assembly 104) that uses dispensers to deposit different types of materials onto the work surface. The dispensing system 310 can selectively remove portions of the powder from the uniform layer of materials using a material removal roller (e.g., the material removal roller 108 of the AM system 100). In some implementations, the dispensing system 310 can selectively deposit materials by using a material dispensing roller (e.g., the material dispensing roller 208 of the AM system 200).

The controller 305 can also transmit instructions to the charging system 315 that can selective impart electrostatic charge such that powder is transferred between surfaces within the AM system 300. For example, the charging system 315 can include an electron source (e.g., the electron source 107 of the AM system 100 and the electron source 207 of the AM system 200) that imparts a spatially controllable electrostatic charge on a roller that can selectively deposit or remove material using the spatially controllable electrostatic charge. The electron source can bombard a surface of the roller with electrons to generate the electrostatic charge. In some examples, the electron source can include a light source that illuminates a photoconductive layer of the roller to impart the spatially controllable electrostatic charge. The charging system 315 can also generate an electrostatic charge on the work surface, the platen, or other support for the powder used in the AM system 300. As such, by selectively manipulating electrostatic charge of the different components of the AM system 300, the charging system 315 can cause powder to be deposited within specific portions determined by the instructions and to be transferred between different surfaces of the AM system 300.

A fusing system 320 of the AM system 300 can fuse powder deposited on the work surface using a energy source such that the powder can fuse. The AM system 300 can execute successive depositing and fusing of the powder to generate the part corresponding to the CAD data. The energy source of the fusing system 320 can be a heater lamp that generates a uniform temperature increase across a layer of the powder deposited on the work surface. The energy source of the fusing system 320 can be a scanning laser that generates a beam of focused energy that increases a temperature of a small area of the layer of the powder. Thus, the scanning laser can function as a point energy source. The fusing system 320 can fuse the powder by using, for example, a sintering process, a melting process, or other process to cause the powder to form a solid mass of material.

A movement system 325 of the AM system 300 can include drive systems that move various components of the AM system 300. For example, the drive systems can cause translation and/or rotation of rollers, platens, energy sources, dispenser assemblies, dispensers, and other components of the AM system 300. In one example, the drive system can rotate the roller and the electron source of the AM system 300 to control a spatial distribution of the electrostatic charge on the surface of the roller. In another example, the drive system can decrease a height of the work surface (e.g., increase a relative distance between the dispensing system 310 and the work surface) such that successive layers can be deposited on top of one another above the work surface. The drive system can also move the energy source such that various portions of the deposited layers of powder can be fused.

The electron source can impart the spatially controllable electrostatic charge on the roller after, for example, a full rotation of the roller across the surface of the platen. In some cases, a full rotation of the roller can cause the roller to cover a portion of the surface of the platen. As a result, the electron source can execute several charging operations to impart several different patterns of the spatially controllable electrostatic charge on the roller.

The materials of the powder described herein (e.g., the powders 124a, 124b, 224a, 224b) can be selected to facilitate the selective removal of the powders. The powder can be metallic feed materials that are attracted to the electrostatic charge imparted on the roller (e.g., the material removal roller 108 and the material dispensing roller 208). A first powder can be formed of a first feed material of a lower melting temperature than a second feed material of a second powder such that a energy source (e.g., the energy source 110) can provide an amount of heat that can fuse the first powder without fusing the second powder. Thus, a deposited cluster of first feed material can melt and thus fuse together to form fused material, whereas the second feed material remains in loose (i.e., powder) form. Examples of metallic particles include titanium, stainless steel, nickel, cobalt, chromium, vanadium and various alloys of these metals. In some examples, the first powder can be a substrate material that becomes the part, and the second powder can be a supporting material that supports the substrate material as each layer of the part is fabricated by the AM system.

An AM system can selectively deposit multiple types of materials having varying material and electrostatic properties such that the AM system can impart different degrees of electrostatic charge to each of the different types of materials. For example, the first and second feed materials can have different charge carrying properties such that the electrostatic charge on a surface of the roller differentially affects each of the first and second feed materials. In some cases, the first feed material can hold less electrostatic charge than the second feed material, and thus, the electrostatic charge on the surface of the roller will attract the second feed material but does not attract the first feed material. The materials can include functional groups that modulate the electrostatic properties. The first and/or second feed materials can be tailored to include functional groups that increase or decrease charge carrying properties of the feed materials. For example, the functional groups can include oxides, nitrides, calcium fluoride, or sapphire.

As an alternative or in addition to the radiative and/or conductive heat and energy sources described in FIGS. 1 to 3, plasma based systems can also be used to achieve layerwise fusing of feed materials. A plasma generation system can include a cathode that can be translated vertically and an anode connected to a energy source. The plasma generation system can fill a region between the cathode and the anode to cause ion bombardment on the powder on the surface of the platen of the AM system. The ions used in the ion bombardment can come from the plasma, and be accelerated to the feed material when either a DC or an AC bias is applied on the feed material. Ion bombardment can be used to treat a layer, to etch material, to chemically alter (e.g., in reactive ion etch) the feed material, to dope the feed material (e.g., to add a nitride layer), or be used for surface treatment.

The electrostatically chargeable chucks (e.g., the chucks of the platens 106, 206) can support an ultra-thin substrate (e.g., between about 10 to 200 microns thick) formed of, for example, the powder 124 or the powder 224. The chuck can include a carrier with a dielectric material and an electrically conductive layer disposed on a top surface of the carrier. A dielectric layer can be disposed over the electrically conductive layer, such that the electrically conductive layer is disposed between the carrier and the dielectric layer. A conductor can be coupled to the electrically conductive layer. The chuck can be configured to electrostatically retain the ultra-thin substrate to the chuck.

A number of implementations have been described. Nevertheless, it will be understood that various modifications may be made. Accordingly, other implementations are within the scope of the following claims.

What is claimed is:

1. An additive manufacturing system, comprising:
   a dispenser to deliver a plurality of successive layers of powder over a support, the plurality of successive layers including a bottom layer deposited on the support and remaining layers each deposited on an underlying layer of fused powder;
   an electron source to impart a spatially controllable electrostatic charge to a surface;
   an actuator configured to move the surface relative to the support such that the spatially controllable electrostatic charge on the surface causes removal of a corresponding portion of an outermost layer of powder on the support; and
   an energy source to fuse at least some of the outermost layer of powder.

2. The system of claim 1, comprising a rotatable roller having the surface, the roller movable parallel to a top surface of the support.

3. The system of claim 2, wherein the roller comprises a photoconductive layer, and the electron source comprises a coronal discharge unit to impart a uniform charge on the roller and a light source to illuminate the roller to generate the spatially controllable electrostatic charge on the surface of the roller.

4. The system of claim 1, wherein the electron source comprises an electron gun.

5. The system of claim 1, wherein the energy source comprises a lamp array configured to fuse substantially all of the outermost layer of powder.

6. The system of claim 1, wherein the dispenser comprises a nozzle configured to eject the powder and movable parallel to a top surface of the support.

7. The system of claim 1, wherein the support comprises an electrostatically chargeable chuck.

8. The system of claim 1, wherein the energy source comprises a laser configured to scan the outermost layer of powder.

9. The system of claim 1, wherein the surface comprises a photoconductive layer, and the electron source is configured to impart a uniform charge on the surface and to illuminate the surface to discharge the surface to generate the spatially controllable electrostatic charge on the surface.

10. The system of claim 2, wherein the actuator is configured to rotate the roller.

11. The system of claim 10, wherein the roller is configured such that friction between the powder and the roller causes the roller to translate across the support.

12. The system of claim 2, wherein the actuator is configured to translate the roller linearly across the support.

13. The system of claim 2, wherein the roller extends across a width of the support.

14. The system of claim 2, wherein a circumference of the roller is substantially equal to a length of the support.

15. The system of claim 2, comprising a blade to remove powder from the surface of the roller.

16. An additive manufacturing system, comprising:
   a support having an electrostatically chargeable chuck that is segmented into portions, each portion having a controllable electrostatic charge;
   a dispenser to deliver a plurality of successive layers of powder over a support, the plurality of successive layers including a bottom layer deposited on the support and remaining layers each deposited on an underlying layer of fused powder;
   an electron source to impart an electrostatic charge to a surface;

an actuator configured to move the surface relative to the support such that a spatially controllable electrostatic charge on the chuck causes removal of a corresponding portion of an outermost layer of powder on the support; and an energy source to fuse at least some of the outermost layer of powder.

17. The system of claim 16, wherein the electron source comprises a coronal discharge unit to impart a uniform charge on the surface.

* * * * *